United States Patent Office 3,269,837
Patented August 30, 1966

3,269,837
LIGHT-SENSITIVE SALTS OF o-NAPHTHOQUI-
NONE DIAZIDE SULFONIC ACID WITH AN
AMINE AND THE PREPARATION OF PRINT-
ING PLATES THEREFROM
Oskar Süs, Wiesbaden-Biebrich, Germany, assignor, by
mesne assignments, to Azoplate Corporation, Murray
Hill, N.J.
No Drawing. Filed Oct. 1, 1964, Ser. No. 400,936
Claims priority, application Germany, Oct. 3, 1963,
K 50,993
18 Claims. (Cl. 96—33)

Esters and amides of o-naphthoquinone diazide sulfonic acids have been used heretofore as light-sensitive constituents of materials for the production of planographic printing plates. The use of the free sulfonic acids and the alkali metal salts thereof, which would be considerably more economical, is not possible since they are too soluble in the aqueous developing solutions which are used in the process.

The present invention provides a light-sensitive material for use in the production of a printing plate, the latter comprising a support having a light-sensitive coating including a salt, which is insoluble or sparingly soluble in water, of an o-naphthoquinone diazide sulfonic acid with a substituted or unsubstituted primary, secondary or tertiary amine containing no heterocyclic nitrogen atom but in which the amino group bound to the sulfonic acid group contains an organic radical containing at least six linked carbon atoms. Such a light-sensitive material has a good shelf-life and photocopies prepared therefrom exhibit good resistance to aqueous developing solutions and mechanical stresses.

The above-mentioned salts can be either of the formulae:

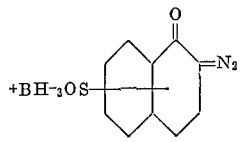

and

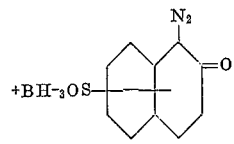

wherein +BH represents the cation of the amine. The $SO_3^-$ group may be in the 3, 4, 5, 6, 7 or 8-position of the naphthoquinone diazide ring. As noted below, however, the salt may also be a polyvalent salt of an amine containing more than one free amino group.

Since it is necessary that the salts should be insoluble or very sparingly soluble in water and dilute aqueous solutions, especially aqueous-alkaline solutions it is necessary that the amine utilized to form the salt should contain, as an oleophilic radical, at least one organic radical containing at least six linked carbon atoms. The amine may be an aliphatic, cycloaliphatic, araliphatic, aromatic or heterocyclic amine but, when heterocyclic, the amine must not contain a nitrogen atom in the heterocyclic ring since most heterocyclic nitrogen bases are soluble in water and in aqueous solutions. Preferred aliphatic amines are those which contain at least one long chain aliphatic radical containing at least ten carbon atoms, since such radicals are highly oleophilic. Preferred aromatic amines are those derived from polynuclear systems, for example amines of naphthalene, diphenyl, fluorene or anthracene. The oleophilic nature of the resulting salts is increased when the aromatic amine also contains one long or two or more shorter alkyl groups. The total number of carbon atoms in the amine is therefore preferably at least ten. Suitable heterocyclic amines are amines of heterocyclic compounds containing oxygen or sulfur, such as dibenzofuran and thionaphthene. The hydrocarbon radicals of the amines may contain substituents, provided these do not confer on the resulting salt any appreciable solubility in water. Thus, aromatic radicals may contain, as substituents, hydroxy, ether, thioether, ester, keto or nitro groups or fluorine, chlorine or bromine atoms. Free sulfonic acid groups and carboxyl groups are, in general, not suitable as substituents as the resulting salts would be too soluble in water.

Exemplary of suitable amines are: aliphatic and cycloaliphatic amines such as n-hexylamine, n-octylamine, n-decylamine, n-dodecylamine, n-tetradecylamine, n-hexadecylamine, oleylamine, n-octadecylamine, n-eicosylamine, di-n-hexylamine, methyl-n-tetradecylamine, di-n-hexadecylamine, di-n-octadecylamine, dimethyl-n-hexylamine, tri-n-hexylamine, dimethyl-n-tetradecylamine, tri-n-octadecylamine, cyclohexylamine, methylcyclohexylamine, ethylcyclohexylamine, dicyclohexylamine and tricyclohexylamine; araliphatic amines such as mono-, di- and tribenzylamine and methyl-(phenyl-ethyl-)-amine; and aromatic and heterocyclic amines such as aniline, the isomeric toluidines and xylidenes, α- and β-naphthylamine, 3-aminofluorene, 1-aminoanthracene and 2-aminodibenzofuran. Diamines or polyamines containing at least six linked carbon atoms may also be used, in which case one or more of the amino groups may be acylated, for example acetylated or benzoylated.

As already noted, the salt may be a polyvalent salt of an amine containing more than one free primary, secondary or tertiary amino group, for example, the di-o-naphthoquinonediazide sulfonates of p-p'-diamino-diphenyl, p,p'-diamino-diphenylmethane, p,p'-diaminobenzophenone,1,6-diaminohexane and 1,12-diaminododecane.

The aforementioned salts may be applied to the support individually, or as a mixture of two or more different salts, in solution in an organic solvent. Suitable solvents are aliphatic alcohols, for example, ethanol and n-butanol; diols and diol ethers, for example ethyleneglycolmonoethylether, and ethyleneglycolmonomethylether; aliphatic ketones, for example methylethyl-ketone and cyclohexanone; acyclic and cyclic ethers, for example di-n-butyl ether, dioxane and tetrahydrofuran; esters, for example butyl acetate; carboxylic acid amines, for example dimethyl formamide; and sulfoxides; for example dimethyl sulfoxides. Solvents having a boiling point between 100 and 130° C. are preferred. The coating is normally pre-dried, expediently in a current of warm air, e.g. at 50° C., and then dried again for a short time at a higher temperature, for example 100° C.

The support may be of metal, for example zinc or aluminum, aluminum being preferred.

After exposure under an original, the resulting copy may be treated for a short time, for example thirty seconds, with an aqueous alkaline developing solution. Thus, an aqueous solution of a diamine such as ethylenediamine, an alkanolamine such as monoethanolamine or diethanolamine, or of sodium metasilicate or sodum phosphate may be applied to the copy by means of a pad. The developing solution may contain a small amount of a low molecular weight alcohol, for example up to 10% or 20% by weight of methanol or ethanol.

Due to the low solubility of the salt in water and dilute alkalis, the copy may be developed to produce a printing plate without damaging the areas which were not exposed to light. In the exposed areas, the light-reaction products are removed by the developing solution, and the bared portions of the metal support are simultaneously rendered hydrophilic. The unexposed areas of the support are receptive to greasy ink. After treatment with greasy ink, for example by roller application, a copy is obtained which is a positive of the original and which is suitable for use as a printing plate.

In order to achieve good printing runs, it is desirable to include a resin in the coatings, especially a resin which is soluble in alkali, for example a phenol-formaldehyde resin or a copolymer of a vinyl compound with maleic acid anhydride. Such resins prevent crystallizing out of the light-sensitive substance on the surface of the support and promote the formation of a coating film. After development of the copy, they remain in the image areas and increase the mechanical resistance of the plate to abrasion in the printing machine.

The aforementioned amino salts of o-naphthoquinone diazide sulfonic acids may be prepared by reacting an alkali metal salt of the selected o-naphthoquinone diazide sulfonic acid with a salt of the selected amine in an aqueous or an aqueous-alcoholic solution, whereupon the amino salt of the o-naphthoquinone diazide sulfonic acid is precipitated. A number of these salts are new compounds.

Printing plates produced from the light-sensitive material according to the invention may be used for planographic printing and relief printing.

The invention will be further described with reference to Examples 1 to 4 and the following table. In the examples, parts by weight are in grams and parts by volume in ml. The formulae of the amino salts of o-naphthoquinone diazide sulfonic acid used are shown in column 1 of the table. The melting or decomposition point of the salt is given in column 2, and its color in column 3. Column 4 states the composition of the sensitizing solution applied to the support, the term "salt" meaning the amino salt of column 1. The composition of the aqueous developing solution used is given in column 5.

EXAMPLE 1

1.5 parts by weight of the compound of Formula 4 in the table below and 3.5 parts by weight of the phenol-formaldehyde novolak commercially available under the name "Alnovol" are dissolved in 100 parts by volume of a mixture of 80 parts by volume of glycolmonomethylether and 20 parts by volume of butyl acetate. One side of an aluminum foil which has been mechanically roughened on both sides is coated with this solution on a whirl-coater; the coated side is dried in a warm current of air. The sensitized foil is then further dried for 2 minutes at 100° C., in order to completely remove the solvent, and it is then exposed for 2 minutes under a positive film original to the light from a closed carbon arc lamp of 18 amperes at a distance of 70 cm. The exposed foil is then developed, by applying to it by means of a pad of cotton, an aqueous solution containing 10% by weight of trisodium phosphate. As the result of this treatment, the support is bared in the exposed areas, and an image corresponding to the original appears on a metallic background. The developed foil is washed with water, wiped over with an aqueous solution containing 1% by weight of phosphoric acid and then inked up with greasy ink. A positive printing plate is obtained from which copies may be produced in conventional printing machines.

Equally good results may be achieved using, alternatively, salts of the Formulae 1, 2, 3, 5, 6, 7 and 9 to 17 in the table below. The compositions of the sensitizing solutions and of the developers to be used with these salts are also given in the table.

The salt of Formula 4 may be prepared by dissolving 27.2 parts by weight of the sodium salt of naphthoquinone-1,2-diazide-2-sulfonic acid-(5) in 200 parts by volume of distilled water and adding this solution dropwise, at room temperature and while stirring well, to a solution of 22.2 parts by weight of dodecylamine hydrochloride in 220 parts by volume of a mixture of ten parts by volume of water and 1 part by volume of ethanol. During a reaction time of 30 minutes, the amino salt of the sulfonic acid is precipitated as a yellow precipitate. After filtering under suction and reprecipitation from di- methylformamide with water, a pale yellow compound of wax-like character is obtained, which melts with decomposition at 141° C. and is readily soluble in glycolmonomethylether, dimethylformamide and a mixture of 8 parts by volume of glycolmonomethylether and 2 parts by volume of butyl acetate. The compounds of Formulae 1–16 may be prepared in an analogous manner. In contrast to the compounds of Formulae 1–16, the compound of Formula 17 is an oil which can not be isolated in an aqueous medium. This oil may be prepared from naphthoquinone-1,2-diazide-2-sulfonic acid-(5) and N,N-dimethyl-dodecylamine by mixing equimolecular solutions of these substances in glycolmonomethylether. The solution is applied to the aluminum foil without isolation of the amino salt.

EXAMPLE 2

One side of an aluminum foil which has been mechanically roughened on both sides is coated with a solution of 1.5 parts by weight of the compound of Formula 20 in the table below and 3.5 parts by weight of "Alnovol" in 100 parts by volume of dimethylformamide, and dried. After exposure, the foil is developed with an aqueous solution containing 5% by weight of trisodium phosphate, wiped over with an aqueous solution containing 1% by weight of phosphoric acid and inked up with greasy ink. The use of a positive original results in a positive printing plate.

The compounds of Formulae 18, 19, 21, 22, 23, 24 and 25 in the table below, which are of similar constitution, can also be used with good results. The appropriate developers and the compositions of the sensitizing solutions are given in the table.

The salt of Formula 20 may be prepared by dissolving 27.2 parts by weight of the sodium salt of naphthoquinone-1,2-diazide-2-sulfonic acid-(5) in 200 parts by volume of distilled water and adding this solution dropwise, at a temperature of not more than 40° C. and with vigorous stirring, to 21.8 parts by weight of 2-aminofluorene hydrochloride dissolved in 250 parts by volume of a mixture of 5 parts by volume of water and 1 part by volume of ethanol. The product separates as an oil during a reaction period of 40 minutes. After intensive cooling, crystallization gradually occurs. The compound melts at 155–160° C., becoming dark in color.

The compounds of Formulae 18 to 25 may be prepared in an analogous manner.

EXAMPLE 3

A solution of 0.5 part by weight of the compound of Formula 8 and 3 parts by weight of "Alnovol" in 100 parts by volume of glycolmonomethylether is applied to an anodized aluminum foil. A printing plate is produced in a manner similar to that described in Example 1. The use of a positive original results in a positive printing plate.

EXAMPLE 4

2 parts by weight of the compound of Formula 4 in the table below are dissolved in 100 parts by volume of glycolmonomethylether which also contains 1.5 parts by weight of the polyvinyl acetate dispersion commercially available under the registered trademark "Mowilith"–90, 10 parts by weight of "Alnovol" and 0.5 part by weight of a black dye, and a smoothly polished zinc plate is coated with this solution on a whirl-coater at 180–200 revolutions per minute. After drying, exposure is effected under a diapositive for 5 minutes with a fluorescent tube having sufficient ultra-violet emission. The exposed plate is developed at room temperature with an aqueous solution containing, in 1000 parts by volume of water, 3 parts by weight $NaH_2PO_4$ calc., 17 parts by weight of $Na_3PO_4$, and 58 parts by weight of $Na_2SiO_3 \cdot 9H_2O$.

In order to produce a printing plate for relief printing, the copy obtained after exposure and development is deep-etched with nitric acid. The resulting engraved plate can be used in a conventional letterpress printing machine.

Table

[All Percentages by Weight]

| No. | 1 Formula | 2 Melting point, °C. | 3 Color | 4 Sensitizing solution | 5 Developing solution (aqueous) |
|---|---|---|---|---|---|
| 1 | 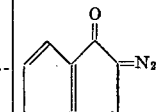 $SO_3^- \ ^+H_3N-CH_2-(CH_2)_4-CH_3$ | 153 | Yellow | 1.5% salt; 3.5% "Alnovol" in glycolmonomethyl-ether/dioxane (80:20). | 5% trisodium phosphate. |
| 2 | 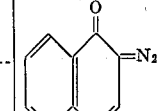 $SO_3^- \ ^+H_3N-CH_2-(CH_2)_6-CH_3$ | 151 | Yellow | 1.5% salt; 3.5% "Alnovol" in glycolmonomethyl-ether. | 60% diethanolamine. |
| 3 | 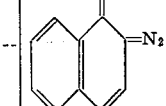 $SO_3^- \ ^+H_3N-CH_2-(CH_2)_8-CH_3$ | [1] 152 | Pale yellow. | 1.5% salt; 3.5% "Alnovol" in glycolmonomethyl-ether. | 10% trisodium phosphate. |
| 4 | 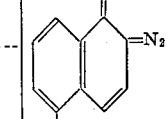 $SO_3^- \ ^+H_3N-CH_2-(CH_2)_{10}-CH_3$ | [1] 141 | Pale yellow. | 1.5% salt; 3.5% "Alnovol" in glycolmonomethyl-ether/butyl acetate (80:20). | 10% trisodium phosphate. |
| 5 | 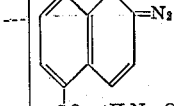 $SO_3^- \ ^+H_3N-CH_2-(CH_2)_{12}-CH_3$ | [1] 138 | Pale yellow. | 1.5% salt; 3.5% "Alnovol" in glycolmonomethyl ether. | 5% trisodium phosphate. |
| 6 | 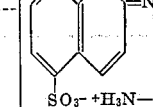 $SO_3^- \ ^+H_3N-CH_2-(CH_2)_{14}-CH_3$ | [1] 140 | Pale yellow. | 1.5% salt; 5% "Alnovol" in glycolmonomethyl-ether. | 5% trisodium phosphate. |
| 7 | 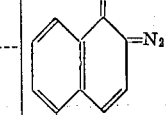 $SO_3^- \ ^+H_3N-CH_2-(CH_2)_{16}-CH_3$ | [1] 142 | Brown-yellow. | 1.5% salt; 5% "Alnovol" in glycolmonomethyl-ether. | 7% trisodium phosphate. |
| 8 | 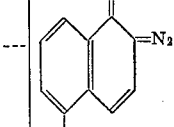 $SO_3^- \ ^+H_3N-CH_2-(CH_2)_{18}-CH_3$ | [1] 144 | Yellow | 0.5% salt; 3% "Alnovol" in glycolmonomethyl-ether. | 7% trisodium phosphate. |
| 9 | 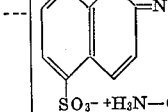 $SO_3^- \ ^+H_3N-CH_2-(CH_2)_{20}-CH_3$ | [1] 143 | Yellow | 1.5% salt; 3.5% "Alnovol" in dimethyl-formamide. | 5% trisodium phosphate. |

Footnotes at end of table.

Table—Continued

| No. | 1 Formula | 2 Melting point, °C. | 3 Color | 4 Sensitizing solution | 5 Developing solution (aqueous) |
|---|---|---|---|---|---|
| 10 | naphthoquinone diazide with $SO_3^- \ ^+H_3N-CH_2-(CH_2)_{10}-CH_3$ 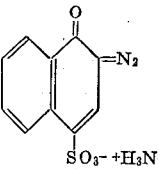 | [1] 128–130 | Pale yellow. | 1.5% salt; 3.5% "Alnovol" in methyl ethyl ketone/dimethylformamide (80:20). | 0.5% $NaH_2PO_4$ calc. 2.0% $Na_3PO_4$ calc. 6.0% $Na_2SiO_3$ in $H_2O$. |
| 11 | $SO_3^- \ ^+H_3N-CH_2-(CH_2)_{12}-CH_3$ 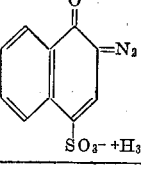 | [1] 136 | Yellow orange. | 1.5% salt; 3.5% "Alnovol" in dioxane. | 1.5% $Na_2SiO_3.9H_2O$. 0.5% polyethylene glycol (M=600) in $H_2O$. |
| 12 | $SO_3^- \ ^+H_3N-CH_2-(CH_2)_{14}-CH_3$ 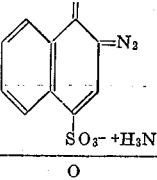 | [1] 138 | Yellow | 1.5% salt; 3.5% "Alnovol" in glycolmonomethyl ether. | 7% trisodium phosphate. |
| 13 | $SO_3^- \ ^+H_3N-CH_2-(CH_2)_{16}-CH_3$ 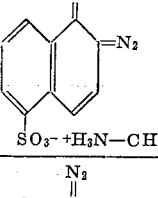 | [1] 128 | Yellow | 1.5% salt; 3.5% "Alnovol" in glycolmonomethyl-ether. | 1% trisodium phosphate. |
| 14 | $SO_3^- \ ^+H_3N-CH_2-(CH_2)_{10}-CH_3$ 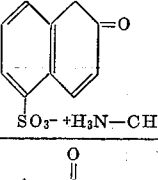 | [1] 110 | Yellow | 1.5% salt; 3.5% "Alnovol" in glycolmonomethyl-ether. | 50% monoethanolamine. |
| 15 | $SO_3^- \ ^+H_3N-CH(CH_2CH_2)_2CH_2$ (cyclohexyl) 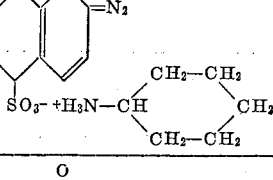 | 150 | Orange-yellow. | 1.5% salt; 3.5% "Alnovol" in glycolmonomethyl-ether. | 35% ethylene diamine. |
| 16 | $SO_3^- \ ^+H_2N(CH_3)-CH_2-(CH_2)_{10}-CH_3$ 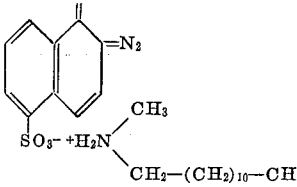 | [1] 108 | Orange | 1.5% salt; 3.5% "Alnovol" in glycolmonomethyl-ether. | 5% trisodium phosphate. |
| 17 | $SO_3^- \ ^+HN(CH_3)_2-CH_2-(CH_2)_{10}-CH_3$ 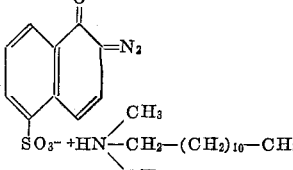 | Oil | Yellow | 1.5% salt; 3.5% "Alnovol" in glycolmonomethyl-ether. | 50% triethanolamine. |
| 18 | $SO_3^- \ ^+H_3N-C_6H_4-CH_3$ 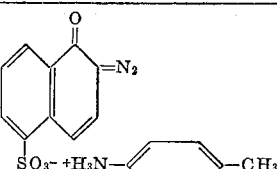 | [1] 149 | Orange-yellow. | 1.5% salt; 3.5% "Alnovol" in glycolmonomethyl-ether. | 0.5% trisodium phosphate. |

Footnotes at end of table.

Table—Continued

| No. | 1 Formula | 2 Melting point, °C. | 3 Color | 4 Sensitizing solution | 5 Developing solution (aqueous) |
|---|---|---|---|---|---|
| 19 | [structure: naphthoquinone diazide sulfonate with diethoxy-phenyl-NH-CO-phenyl amine] | [1] 170 | Pale yellow. | 1.5% salt; 3.5% "Alnovol" in glycolmonomethyl-ether/butyl acetate (80-20). | 10% trisodium phosphate. |
| 20 | [structure: naphthoquinone diazide sulfonate with fluorene amine] | [2] 155–160 | Yellow. | 1.5% salt; 3.5% "Alnovol" in dimethyl formamide. | 5% trisodium phosphate. |
| 21 | [structure: naphthoquinone diazide sulfonate with naphthylamine] | [1] 140 | Pale yellow. | 1.5% salt; 3.5% "Alnovol" in glycolmonomethyl-ether/butyl acetate (80-20). | 5% trisodium phosphate. |
| 22 | [structure: bis-naphthoquinone diazide sulfonate with phenylenediamine bridge] | [1] 167 | Brown-yellow. | 1.5% salt; 3.5% "Alnovol" in dimethyl sulfoxide. | 0.1% disodium phosphate. |
| 23 | [structure: bis-naphthoquinone diazide sulfonate with biphenyl diamine bridge] | [1] 169 | Brown-yellow. | 1.5% salt; 3.5% "Alnovol" in glycolmonomethyl-ether/butyl acetate (80-20). | 0.5% trisodium phosphate. |
| 24 | [structure: bis-naphthoquinone diazide sulfonate with diaminobenzophenone bridge] | [1] 160 | Brown-yellow. | 1.5% salt; 3.5% "Alnovol" in glycolmonomethyl-ether. | 25% monoethanolamine. |
| 25 | [structure: bis-naphthoquinone diazide sulfonate with diaminobenzophenone bridge] | 150–155 | Brown-yellow. | 1.5% salt; 3.5% "Alnovol" in glycolmonomethyl-ether. | 3% trisodium phosphate. |

[1] Decomposition.   [2] Dark.

It will be obvious to those skilled in the art that many modifications may be made within the scope of the present invention without departing from the spirit thereof, and the invention includes all such modifications.

What is claimed is:

1. A presensitized printing plate comprising a base material and a light-sensitive coating thereon, the latter comprising a salt, which is at most sparingly soluble in water, of an o-naphthoquinone diazide sulfonic acid with an amine, the latter containing at least six linked carbon atoms but no heterocyclic nitrogen atom.

2. A presensitized printing plate according to claim 1 in which the base material is metal.

3. A presensitized printing plate according to claim 1 in which the coating contains an alkali-soluble resin.

4. A presensitized printing plate according to claim 1 in which the salt has the formula

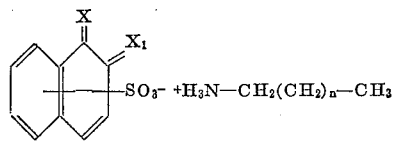

in which X and $X_1$ are selected from the group consisting of $N_2$ and O and are different and $n$ is an integer from 4 to 20.

5. A presensitized printing plate according to claim 1 in which the salt has the formula

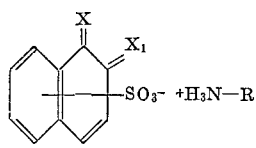

in which X and $X_1$ are selected from the group consisting of $N_2$ and O and are different and R is a heterocyclic group.

6. A presensitized printing plate according to claim 1 in which the salt has the formula

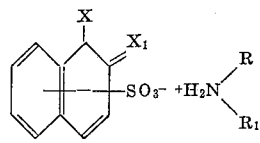

in which X and $X_1$ are selected from the group consisting of $N_2$ and O and are different and R and $R_1$ are alkyl groups.

7. A presensitized printing plate according to claim 1 in which the salt has the formula

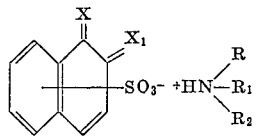

in which X and $X_1$ are selected from the group consisting of $N_2$ and O and are different and R, $R_1$, and $R_2$ are alkyl groups.

8. A presensitized printing plate according to claim 1 in which the salt has the formula

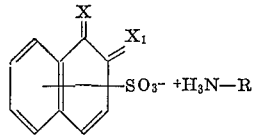

in which X and $X_1$ are selected from the group consisting of $N_2$ and O and are different and R is an aryl group.

9. A presensitized printing plate according to claim 1 in which the salt has the formula

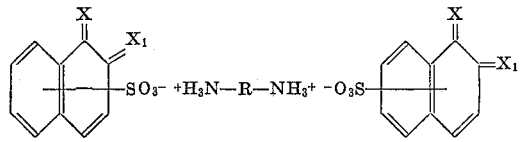

in which X and $X_1$ are selected from the group consisting of $N_2$ and O and are different and R is an arylene group.

10. A process for making a printing plate which comprises exposing a supported light-sensitive layer to light under a master and developing the resulting image with an aqueous alkaline developing solution, the layer comprising a salt, which is at most sparingly soluble in water, of an o-naphthoquinone diazide sulfonic acid with an amine, the latter containing at least six linked carbon atoms but no heterocyclic nitrogen atom.

11. A process according to claim 10 in which the support is metal.

12. A process according to claim 10 in which the layer contains an alkali-soluble resin.

13. A process according to claim 10 in which the salt has the formula

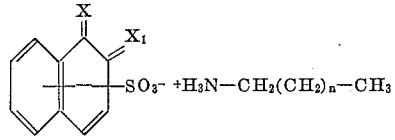

in which X and $X_1$ are selected from the group consisting of $N_2$ and O and are different and $n$ is an integer from 4 to 20.

14. A process according to claim 10 in which the salt has the formula

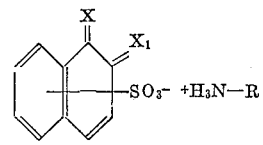

in which X and $X_1$ are selected from the group consisting of $N_2$ and O and are different and R is a heterocyclic group.

15. A process according to claim 10 in which the salt has the formula

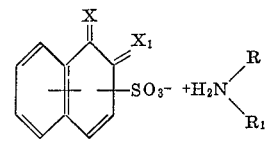

in which X and $X_1$ are selected from the group consisting of $N_2$ and O and are different and R and $R_1$ are alkyl groups.

16. A process according to claim 10 in which the salt has the formula

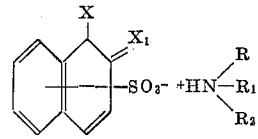

in which X and $X_1$ are selected from the group consisting of $N_2$ and O and are different and R, $R_1$, and $R_2$ are alkyl groups.

17. A process according to claim 10 in which the salt has the formula

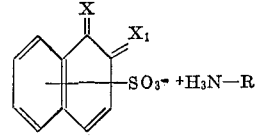

in which X and $X_1$ are selected from the group consisting of $N_2$ and O and are different and R is an aryl group.

18. A process according to claim 10 in which the salt has the formula

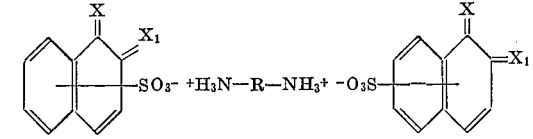

in which X and $X_1$ are selected from the group consisting of $N_2$ and O and are different and R is an arylene group.

No references cited.

NORMAN G. TORCHIN, *Primary Examiner.*

A. D. RICCI, *Assistant Examiner.*